(12) United States Patent  
Jiang et al.

(10) Patent No.: US 10,234,904 B2
(45) Date of Patent: Mar. 19, 2019

(54) DISPLAY DEVICE AND ITS CARRIER ASSEMBLY

(71) Applicant: Wuhan China Star Optoelectronics Technology Co., Ltd., Wuhan, Hubei (CN)

(72) Inventors: Guodong Jiang, Guangdong (CN); Shuru Lin, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 20 days.

(21) Appl. No.: 15/509,516

(22) PCT Filed: Feb. 15, 2017

(86) PCT No.: PCT/CN2017/073677
§ 371 (c)(1),
(2) Date: Mar. 8, 2017

(87) PCT Pub. No.: WO2018/129785
PCT Pub. Date: Jul. 19, 2018

(65) Prior Publication Data
US 2018/0232011 A1 Aug. 16, 2018

(51) Int. Cl.
*G06F 1/16* (2006.01)
*G09F 9/30* (2006.01)
*G02F 1/1333* (2006.01)

(52) U.S. Cl.
CPC ............ *G06F 1/1652* (2013.01); *G09F 9/301* (2013.01); *G02F 1/133308* (2013.01)

(58) Field of Classification Search
CPC ....................................................... G06F 1/16
USPC ..................................................... 361/679.21
See application file for complete search history.

(56) References Cited

U.S. PATENT DOCUMENTS 6,643,124 B1 * 11/2003 Wilk ..................... G06F 1/1616
312/223.1

* cited by examiner

*Primary Examiner* — Jerry Wu
(74) *Attorney, Agent, or Firm* — Andrew C. Cheng

(57) ABSTRACT

The present disclosure relates to the display technology field, and more particularly to a display device, which includes a flexible display panel and a carrier assembly; the carrier assembly includes: a base; a first support and a second support mirror-symmetrical arranged on the base; a third support arranged on the base by a spring. When the first support and the second support are in contact or phase away from each other, the third support can rely on the falling or uplift of the elastic such that the carrier assembly obtains a different plane that carries the flexible display panel. The disclosure is applicable to the display device of the flexible display panel, which can realize the flexible display panel to be easily folded, and the display area can be scaled at any time while satisfying the requirement of the stable carrying flexible display panel and ensuring the display quality.

14 Claims, 2 Drawing Sheets

DISPLAY DEVICE AND ITS CARRIER ASSEMBLY

FIELD OF THE DISCLOSURE

The present disclosure relates to a display device technology field, and more particularly to a display device structure suitable for a flexible display panel.

BACKGROUND OF THE DISCLOSURE

With the development of intelligent terminals, people are demanding more and more display quality, not only to provide a greater display of better display equipment, but also require them to carry, the traditional LCD display can not meet the requirements of users.

OLED technology is known as the next generation of display technology, with the development of OLED display technology matures, the vast number of consumers to experience the OLED display and the traditional LCD display a huge difference, followed by the OLED consumer market is growing rapidly. Because of the characteristics of OLED self-luminous, making the response time is short, high contrast, wide viewing angle, wide color gamut, display panel light, can be bent and other characteristics can be achieved. In particular, OLED display panel can be bent, to the consumer to bring the concept of subversive, so Flexible (foldable) OLED in recent years is the mainstream of the development of the industry.

In the past, most of the flexible display devices employ a folded structure in which the middle frame used to carry the flexible display panel is divided into several assembly parts, and the respective assembly parts are connected by one or more hinge assemblies. With the rotatable structure of the hinge assembly, the adjacent two assembly parts can be folded so that the size of the flexible display device is reduced and conveniently carried. However, due to the presence of the hinges, there is a gap between the adjacent two assembly parts when the display device is fully deployed, and the entire flexible display panel cannot be fully supported, and the partial flexible display panel is in a floating state. In this way, the flexible display panel is liable to cause wrinkles, affecting the display effect; at the same time, the user is liable to damage the flexible display panel due to the absence of the bottom support during the finger touch.

It is desirable to find a display device suitable for deployment or folding of a flexible display panel.

SUMMARY OF THE DISCLOSURE

In order to solve the above-mentioned problems of the prior art, the present disclosure provides a carrier assembly capable of enabling stretching or contraction of a flexible display panel, achieving a reduced size of the display device, easy carrying, and a stable full support of the flexible display panel.

The carrier assembly includes: a base and a first support member and a second support member mirror-symmetrical arranged on the base; further includes a third support member arranged on the base by a spring;

when the first support member and the second support member are in contact with each other, the carrier assembly has a first flat surface formed by stitching the first support member and the second support member for carrying the flexible display panel; the third support member being sandwiched between the first plane and the base;

when the first support member and the second support member are away from each other, the third support member being lifted up by the spring, the carrier assembly has a second flat surface engaged by the third support member and the first support member and the second support member for carrying the flexible display panel.

Wherein, further includes a sliding rail, the first support member and the second support member are connected with the base by the sliding rail; such that the first support member and the second support member are reciprocally movable along the sliding rail.

Wherein, the bottom portion of the first support member and the second support member are provided with a first stopper member and a second stopper member respectively corresponding to the end portions of the sliding rail; for forming a maximum shift limit when the first support member and the second support member are stay away from each other.

Wherein, the outside of the first support member and second support member are respectively arranged with a first arcuate side wall and a second arcuate side wall.

Wherein, the bottom of the first support member and second support member are respectively arranged with a first elastic member and a second elastic member, both ends of each of the flexible display panels extending along the first arcuate side wall and the second arcuate side wall respectively to the bottom of the first support member and second support member, and connected to the first elastic member and the second elastic member, respectively.

Wherein, the top of the first support member and second support member are respectively arranged with a first limit groove and a second limit groove for forming a limit on the flexible display panel.

Wherein, the first support member extending a first holding section in the direction of the second support member along the top surface of the third support member; the second support member extending a second holding section in the direction of the first support member along the top surface of the third support member; the first holding section and the second holding section hold the third support member in an accommodating space surrounded by the first support member, the second support member and the base.

Wherein, the side of the first holding section and second holding section toward the third support member are arranged with a first limit slope and a second limit slope, both ends of the third support member are respectively arranged with a guide slope corresponding to the first limit slope and the second limit slope; the third support member is raised or lowered along the first limit slope and the second limit slope under the guide slope when the first support member and the second support member are moved away or in close proximity.

Wherein, the first support member and the second support member toward the guide slopes of the third support member are arranged with a first registration slope and a second registration slope, respectively, for forming a limit when the third support member is received in the accommodation space.

The present disclosure also provides a display device including the above-described carrier assembly and a flexible display panel arranged on the carrier assembly.

Advantageous Effects

The display device provided by the disclosure is different from the existing folding structure, and the flexible display panel is carried by the retractable load bearing structure to realize the extension or contraction of the flexible display panel; at the same time, the load bearing assembly of the present disclosure can support the entire flexible display panel in a seamless and stable state regardless of whether the display device is in the extended or retracted state, ensuring the best quality of the display quality and the device function.

BRIEF DESCRIPTION OF THE DRAWINGS

The foregoing and other aspects, features and advantages of the embodiments of the present disclosure will become more apparent from the following description taken in conjunction with the accompanying drawings in which.

DETAILED DESCRIPTION OF PREFERRED EMBODIMENTS

Hereinafter, embodiments of the present disclosure will be described in detail with reference to the accompanying drawings. However, the disclosure may be embodied in many different forms and the disclosure should not be construed as limited to the specific embodiments set forth herein. Rather, these embodiments are provided to explain the principles of the disclosure and its practical application so as to enable others skilled in the art to understand the various embodiments of the disclosure and various modifications that are suitable for a particular intended application.

Figure 1:
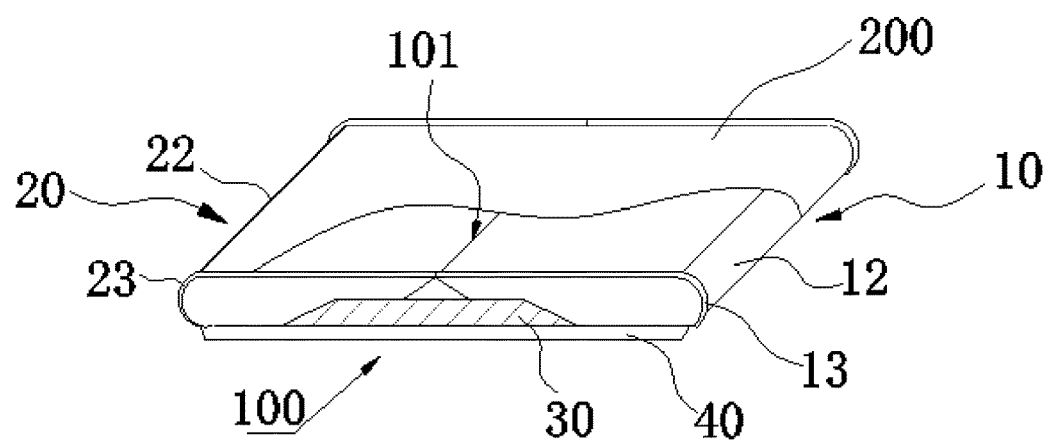
FIG. 1 is a schematic structural view of a display device according to an embodiment of the present disclosure.
Figure 2:
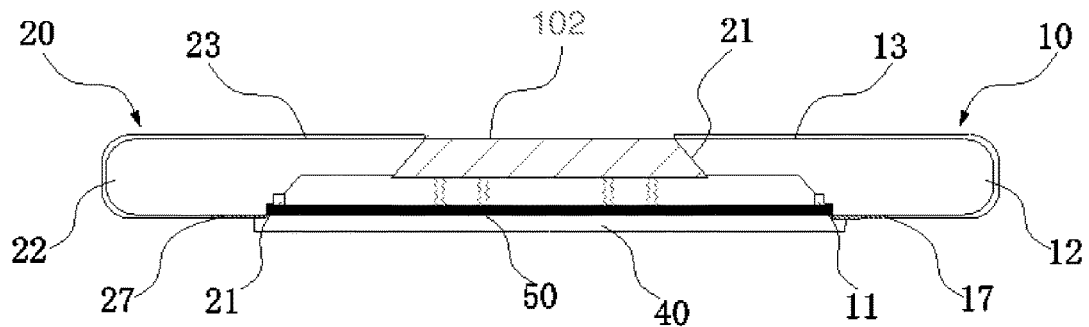
FIG. 2 is a schematic cross-sectional view of another embodiment of the display device of the present disclosure.

As shown in FIG. 1, the present disclosure provides a display device including a flexible display panel 200 and a carrier assembly 100 for supporting the flexible display panel 200. The carrier assembly 100 includes: a base 40, a first support member 10, a second support member 20 and a third support member 30. As shown in FIG. 2, the first support member 10 and the second support member 20 are capable of reciprocating movement on the base 40, showing a state of being in contact with each other or away from each other. Through the first support member 10 and the second support member 20 moved away from each other or in contact with each other, the third support member 30 is lifted or lowered from between the first support member 10 and the second support member 20, achieving an effect that the carrier assembly has different carrier planes so that the flexible display panel 200 can be scaled with the size of the carrier plane.

Specifically, as shown in FIG. 1, the first support member 10 and the second support member 20 are mirror-symmetrical arranged on the base 40; when the first support member 10 and the second support member 20 are in contact with each other, the tops of the first support member 10 and the top of the second support member 20 are located in the same horizontal plane, and the first support member 10 and the second support member 20 are joined to each other to constitute a first plane 101 for carrying the flexible display panel 200.

Combined with the FIG. 2, in order to achieve the first support member 10 and the second support member 20 is able to slide, and the carrier assembly 100 also includes at least one set of sliding rails 50, the first support member 10 and the second support member 20 are connected with the base 40 by the sliding rail 50; so that the first support member 10 and the second support member 20 can be reciprocated along the sliding rail 50 so as to realize a different positional state of contact with each other and away from each other.

In order to limit the sliding range of the first support member 10 and the second support member 20, the bottom of the first support member 10 and second support member 20 corresponding to both ends of the sliding rail 50 further arranged a first stopper member 11 and a second stopper member 21 for forming a maximum displacement limit when the first support member 10 and the second support member 20 are remote from each other. Specifically, when the first support member 10 and the second support member 20 are moved away from each other and gradually reach both ends of the sliding rail 50, the first stopper member 11 and the second stopper member 21 are respectively engaged with the end portion of the sliding rail 50, so that the first support member 10 and the second support member 20 can not continue away from the maximum distance from the displacement. Of course, those skilled in the art will appreciate that in order for the third support member 30 to be lifted to the first plane 101, at least one distance between the first support member 10 and the second support member 20 is not less than the width of the third support member 30, and the third support member 30 is accommodated between the first support member 10 and the second support member 20.

The first support member 10 and the second support member 20 are provided with a first arcuate side wall 12 and a second arcuate side wall 22, respectively. The curved sidewall design allows the flexible display panel to achieve smooth slip when the flexible display panel 200 is displaced relative to the first support member 10 and second support member 20 by the elastic member.

Figure 3:
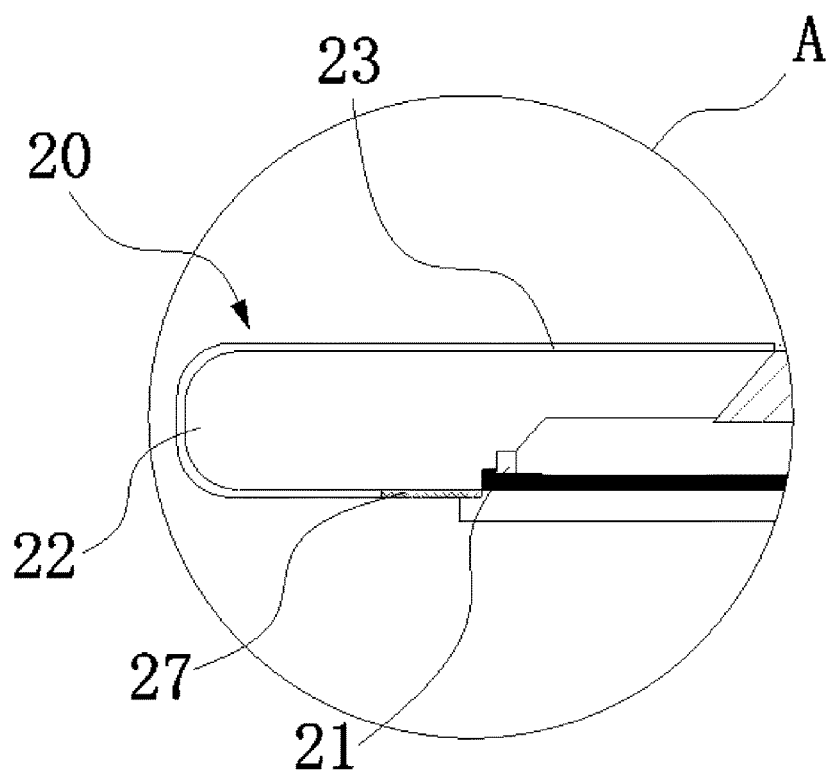
FIG. 3 is an enlarged view of the area A in FIG. 2.

Further, as shown in FIG. 2 and FIG. 3, the bottom of the first support member 10 and second support member 20 are respectively arranged with a first elastic member 17 and a second elastic member 27, both ends of the flexible display panel 200 are respectively extend to the bottom of the first support member 10 and second support member 20 along the first arcuate side wall 12 and the second arcuate side wall 22, and are connected to the first elastic member 17 and the second elastic member 27, respectively. Further, the first elastic member 17 and the second elastic member 27 of the present embodiment may be, for example, a rectangular spring, and the display panel can be kept flat by the elastic deformation potential of the spring.

Specifically, the flexible display panel 200 is passed through the first elastic member 17 and the second elastic member 27 arranged on the first support member 10 and the second support member 20. When the first support member 10 and the second support member 20 are in contact with each other, the first elastic member 17 and the second elastic member 27 are in a tensioned stretching state, and the first elastic member 17 and the second elastic member 27 act together on the flexible display panel such that the flexible display panel to maintain tension, flat state, to ensure that display quality; when the first support member 10 and the second support member 20 are gradually separated from each other, the first elastic member 17 and the second elastic member 27 are separated from each other as the first support member 10 and the second support member 20 are gradually separated from each other, but still in a tensioning state, so that the flexible display panel 200 is always maintained tension, flat state.

In order to keep the position of the flexible display panel 200 relatively stable during the sliding process, the first support member 10 and the second support member 20 are respectively provided with a first limit groove 13, a second limit groove 23, for forming a limit on the flexible display panel 200 so that the flexible display panel does not sway left and right during the slip process.

Combined with the FIG. 1 and FIG. 2, the third support member 30 is trapezoidal and is arranged between the base 40 and the first plane 101. The third support member 30 is provided between the first support member 10 and the second support member 20, and the third support member 30 is connected to the base 40 by an elastic member 31 (shown in FIG. 4). Preferably, the elastic member 31 may be, for example, four springs.

In order to obtain a stable first plane 101, the first support member 10 extending a first holding section 14 along the top surface of the third support member 30 in the direction of the second support member 20; the second support member 20 extending a second holding section 24 in the direction of the first support member 10 along the top surface of the third support member 30; the first holding section 14 and the second holding section 24 hold the third support member 30 in an accommodating space surrounded by the first support member 10, the second support member 20 and the base 40.

In order to cope with the shape of the third support member 30, the first support member 10 and the second support member 20 toward the guide slopes of the third support member 30 are arranged with a first registration slope 16 and a second registration slope 26, respectively, for forming a limit when the third support member 30 is received in the accommodation space.

Preferably, in order to achieve a smooth lifting or lowering of the third support member 30, the sides of the first holding section 14 and second holding section 24 toward the third support member 30 are arranged with a first limit slope 15 and a second limit slope 25, both sides of the third support member 30 are arranged with a guide slope 32 corresponding to the shape of the first limit slope 15 and second limit slope 25.

Figure 4:
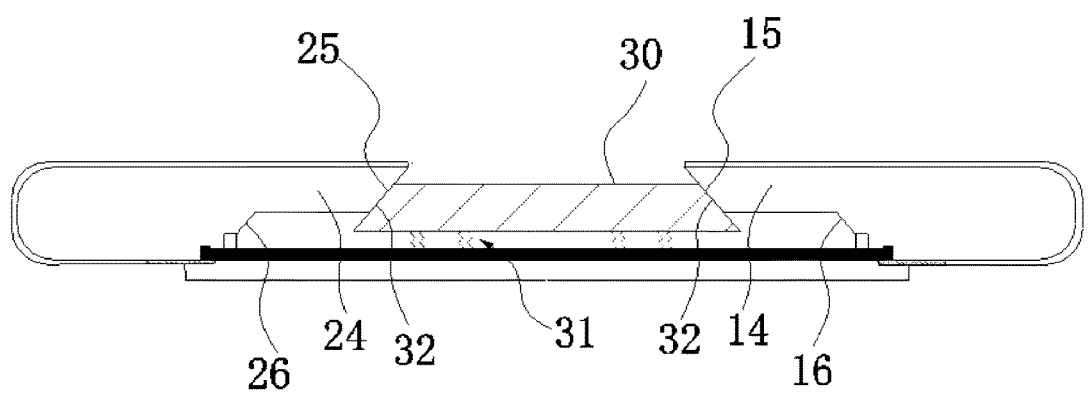
FIG. 4 is a schematic cross-sectional view of the other embodiment of the display device of the present disclosure.

Combined with FIG. 4, when the first supporting member 10 and the second supporting member 20 are gradually separated from each other, the first holding section 14 and the second holding section 24 are gradually separated, and the downward support of the third support member 30 is gradually reduced such that the third support member 30 is gradually lifted under the action of the elastic member 31, finally reaching the original first plane 101, and is spliced together with the first support member 10 and the second support member 20 to form a second plane 102 for carrying the flexible display panel 200. At this time, the elastic member 31 is in a relaxed state. The shape of the first limit slope 15 and second limit slope 25 can correspond to the shape of the guide slope 32 so that the third support member 30 can form a "seamless stitch" between the first support member 10 and the second support member 20. The flexible display panel 200 is "hidden" in the portion of the bottom of the first support member 10 and the second support member 20 and is gradually drawn to the first arcuate side wall 12 and the second arcuate side wall 22 and even to the top of the first support and the second support while the first support member 10 and the second support member 20 are remote from each other. The first elastic member 17 and the second elastic member 27 are simultaneously stretched to keep the flexible display panel slidably on the first support member and the second support member. Until the second plane 102 combination is completed, the task of supporting the entire flexible display panel 200 is supported by the first support member 10, the second support member 20 and the third support member 30 so that the flexible display panel 200 can obtain a full, uniform and effective support effect, to ensure the use of flexible display panel quality, function is guaranteed. At this point, you can see the full expansion of the flexible screen, to achieve flexible screen in the size of the extension.

When the first support member 10 and the second support member 20 are brought closer to each other from the state where the first support member 10 and the second support member 20 are gradually close to each other, the first limit slope 15 and the second limit slope 25 are capable of forming a pressing force to the guide slope 32, forcing the third support member 30 to descend and the elastic member 31 is gradually compressed, and finally the third support member 30 is lowered along the first limit slope 15 and the second limit slope 25 under the guide slope 32 return to the containment space enclosed by the first support member, the second support member and the base. At this time, the first support member 10 and the second support member 20 are brought into contact with each other to restore the first plane 101. During the process in which the first support member 10 and the second support member 20 are close to each other, the flexible display panel 200 is "exposed" to the first arcuate side wall 12, the second arcuate side wall 22 or the top portion of the first support member 10 and second support member 20, is gradually pulled back by the first elastic member 17 and the second elastic member 27 to the bottom surface of the first support member and the second support member. The first elastic member 17 and the second elastic member 27 remain the flexible display panel always slide against the first support and the second support. Until the first plane 102 combination is completed, the task of supporting the entire flexible display panel 200 is carried out by the first support member 10 and the second support member 20, at this point, you can see the full retraction of the flexible screen, to achieve a flexible screen in the size of the narrow, to meet the portable features.

The display device provided by the disclosure is different from the existing folding structure, and the flexible display panel is carried by the telescopic load bearing structure to realize the telescopic folding of the flexible display panel, the exquisite portable function, at the same time, to fully and steadily support the entire flexible display panel, no floating state, to ensure that the display quality and device function to obtain the best results.

While the present disclosure has been shown and described with reference to specific embodiments, it will be understood by those skilled in the art that various changes in form and detail may be made therein without departing from the spirit and scope of the disclosure as defined by the appended claims and their equivalents.

What is claimed is:

1. A carrier assembly for carrying a flexible display panel in a display device, wherein
the carrier assembly comprises: a base and a first support member and a second support member mirror-symmetrical arranged on the base and further comprises a third support member arranged on the base by a spring;
when the first support member and the second support member are in contact with each other, the carrier assembly has a first plane formed by jointing top surfaces of the first support member and the second support member for carrying the flexible display panel; and the third support member is located between the first plane and the base; and
when the first support member and the second support member are moved away from each other, the third support member is lifted up by the spring, such that the carrier assembly has a second plane that is formed by jointing a top surface of the third support member with the top surfaces of the first support member and the second support member for carrying the flexible display panel.

2. The carrier assembly according to claim 1, further comprising a sliding rail, wherein the first support member and the second support member are connected with the base by the sliding rail, such that the first support member and the second support member are reciprocally movable along the sliding rail.

3. The carrier assembly according to claim 1, wherein a bottom portion of the first support member and a bottom portion of the second support member are provided with a first stopper member and a second stopper member, respectively, corresponding to end portions of a sliding rail to define a maximum shift limit when the first support member and the second support member are moved away from each other.

4. The carrier assembly according to claim 1, wherein outsides of the first support member and second support member are respectively arranged with a first arcuate side wall and a second arcuate side wall.

5. The carrier assembly according to claim 4, wherein bottoms of the first support member and second support member are respectively arranged with a first elastic member and a second elastic member, the flexible display panel having two ends extending along the first arcuate side wall and the second arcuate side wall, respectively, to the bottoms of the first support member and second support member and connected to the first elastic member and the second elastic member, respectively.

6. The carrier assembly according to claim 1, wherein tops of the first support member and second support member are respectively arranged with a first limit groove and a second limit groove for limiting the flexible display panel.

7. The carrier assembly according to claim 2, wherein tops of the first support member and second support member are respectively arranged with a first limit groove and a second limit groove for limiting the flexible display panel.

8. The carrier assembly according to claim 3, wherein tops of the first support member and second support member are respectively arranged with a first limit groove and a second limit groove for limiting the flexible display panel.

9. The carrier assembly according to claim 4, wherein tops of the first support member and second support member are respectively arranged with a first limit groove and a second limit groove for limiting the flexible display panel.

10. The carrier assembly according to claim 5, wherein tops of the first support member and second support member are respectively arranged with a first limit groove and a second limit groove for limiting the flexible display panel.

11. The carrier assembly according to claim 1, wherein, the first support member comprises a first holding section extending in a direction toward the second support member and the second support member comprising a second holding section extending in a direction toward the first support member such that the first holding section and the second holding section are selectively located on the top surface of the third support member to hold the third support member in an accommodating space surrounded by the first support member, the second support member and the base.

12. The carrier assembly according to claim 11, wherein sides of the first holding section and second holding section toward the third support member are, respectively, arranged with a first limit slope and a second limit slope, and two ends of the third support member are respectively arranged with guide slopes corresponding to the first limit slope and the second limit slope, wherein the third support member is raised or lowered with the guide slopes thereof sliding along the first limit slope and the second limit slope under the guide slope when the first support member and the second support member are moved away or in close proximity.

13. The carrier assembly according to claim 12, wherein the first support member and the second support member are provided, in a manner of facing toward the guide slopes of the third support member, a first registration slope and a second registration slope, respectively, for forming a limit when the third support member is received in the accommodation space.

14. A display device comprising a carrier assembly and a flexible display panel arranged on the carrier assembly, wherein the carrier assembly comprises: a base and a first support member and a second support member mirror-symmetrical arranged on the base; and further comprises a third support member, the third support member is arranged on the base by a spring member;
when the first support member and the second support member are in contact with each other, the carrier assembly has a first plane formed by jointing top surfaces of the first support member and the second support member for carrying the flexible display panel; and the third support member is located between the first plane and the base; and
when the first support member and the second support member are moved away from each other, the third support member is lifted up by the spring, such that the carrier assembly has a second plane that is formed by jointing a top surface of the third support member with the top surfaces of the first support member and the second support member for carrying the flexible display panel.

* * * * *